US006546403B1

(12) United States Patent
Carlson, Jr. et al.

(10) Patent No.: US 6,546,403 B1
(45) Date of Patent: Apr. 8, 2003

(54) MECHANISM TO RESUBMIT QUERIES IN A PARALLEL DATABASE SYSTEM

(75) Inventors: William G. Carlson, Jr., Poughkeepsie, NY (US); Brian J. O'Leary, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/487,431

(22) Filed: Jan. 19, 2000

(51) Int. Cl.[7] .............................................. G06F 17/30
(52) U.S. Cl. .............................. 707/202; 707/4; 707/5; 707/10; 707/100; 707/3
(58) Field of Search ........................ 707/10, 100, 202, 707/5, 3, 4; 714/4, 1; 713/200; 709/212, 217, 219

(56) References Cited

U.S. PATENT DOCUMENTS

| | | | | |
|---|---|---|---|---|
| 5,247,664 A | | 9/1993 | Thompson et al. | 395/600 |
| 5,437,032 A | | 7/1995 | Wolf et al. | 395/650 |
| 5,495,606 A | | 2/1996 | Borden et al. | 395/600 |
| 5,590,319 A | | 12/1996 | Cohen et al. | 395/604 |
| 5,613,106 A | | 3/1997 | Thurman et al. | 395/620 |
| 5,675,791 A | | 10/1997 | Bhide et al. | 395/621 |
| 5,692,174 A | | 11/1997 | Bireley et al. | 395/603 |
| 5,699,500 A | * | 12/1997 | Dasgupta | 714/1 |
| 5,742,806 A | | 4/1998 | Reiner et al. | 395/600 |
| 5,857,180 A | | 1/1999 | Hallmark e al. | 707/2 |
| 5,964,886 A | * | 10/1999 | Slaughter et al. | 709/212 |
| 5,996,075 A | * | 11/1999 | Matena | 713/200 |
| 6,161,191 A | * | 12/2000 | Slaughter et al. | 714/4 |
| 6,173,413 B1 | * | 1/2001 | Slaughter et al. | 707/202 |
| 6,192,401 B1 | * | 2/2001 | Modiri et al. | 370/254 |
| 6,243,814 B1 | * | 6/2001 | Matena | 713/200 |

* cited by examiner

*Primary Examiner*—Jean M. Corrielus
(74) *Attorney, Agent, or Firm*—Lawrence D. Cutter; Floyd A. Gonzalez

(57) ABSTRACT

An apparatus, method and program product for resubmitting queries encompassed by a Query Management Subsystem (QMS) responsive to high availability recovery actions within itself and a database subsystem it is designed to serve. The invention includes a work queue, a database subsystem, and a first QMS server which invokes and tracks queries in the work queue (received through traditional client interface means) as delivered to the database subsystem. A Query Resubmittal Mechanism (QRM) in the QMS is responsive to the database, client, and high availability recovery actions for both the QMS and database subsystem. The QRM modifies the status of queries in the work queue depending on whether a query has been submitted to the database or a database query response has been received. Incoming client queries are placed in the work queue (with queued status Q). Completed queries from the database are removed from the work queue and answer sets returned to the originating client. The QRM modifies the status of the oldest queries in the work queue from queued (Q) to active (A) and submits them to the database if the number of queries marked as active (A) in the work queue are under a user-defined, adjustable limit. The QRM determines if reconfiguration of the database subsystem has been completed in response to high availability recovery actions. QRM then modifies the adjustable limit and/or job priorities of the uncompleted queries if the database subsystem is operating in a degraded state (or returning to a repaired state) due to said reconfiguration. The work queue becomes durable by making it accessible to a backup, second server, and implementing a high availability configuration to restart the QMS/QRM on the backup server. When the QMS/QRM is started (after an operator shutdown) or restarted on the backup server (in the high-availability configuration), the QRM interrogates the work queue to determine if it contains uncompleted queries and resubmits them, up to the adjustable limit.

20 Claims, 2 Drawing Sheets

MECHANISM TO RESUBMIT QUERIES IN A PARALLEL DATABASE SYSTEM

The present invention relates to a query management subsystem wherein queries are submitted to a parallel database, and more particularly relates to resubmitting queries to a parallel database in the event of a system failure or the reconfiguration of the parallel database wherein the parallel database operates in a degraded state.

BACKGROUND OF THE INVENTION

Query Management Subsystems (QMS), are known in which large parallel systems comprised of hundreds of computers execute complex queries in a data warehousing environment that is implemented on a parallel cluster of computers. Each query can potentially take hours to complete. It is imperative to manage and schedule effectively the workload as well as guarantee the completion of a query, even for events such as brief system outages or recovery actions. These events tend to occur more frequently in a large parallel cluster. Even more important is the allowing of dynamic changes of policies to be enforced on the queries if the parallel system is functioning in a degraded state or if it is desired to prioritize certain types of queries.

Most sizable data warehouses are built from large parallel computers, where every processing node (computer) in the parallel system will work on a piece of the total database for each incoming query. This imposes a database structure that is segmented across the entire parallel computer. Thus, in a system of N nodes, the query speedup can approach 1/N, compared to a query run on just one node. This performance is critical and germane to why the parallel architecture is employed. In addition, the types of queries run on a data warehouse are different from transactions usually run on an On Line Transaction Processing (OLTP) system. The data warehousing queries are complex, long-running and, because of the database structure, requires multiple node participation in the queries. Thus, since all parallel database nodes are generally used for all warehousing queries, should any one of the nodes fail, all queries running at the instant of the failure will be aborted. Furthermore, these warehousing queries will have to be resubmitted after the parallel database system is made available.

U.S. Pat. No. 5,247,664 issued Sep. 21, 1993 to Thompson et al. for FAULT-TOLERANT DISTRIBUTED DATABASE SYSTEM AND METHOD FOR THE MANAGEMENT OF CORRECTABLE SUBTRANSACTION FAULTS BY THE GLOBAL TRANSACTION SOURCE NODE, discloses a fault-tolerant method and system for processing global transactions in a distributed database system. If a fault occurs in the distributed database system, a transaction management system will suspend the processing of a transaction and renew it when the fault is remedied.

U.S. Pat. No. 5,495,606 issued Feb. 27, 1996 to Borden et al. for SYSTEM FOR PARALLEL PROCESSING OF COMPLEX READ-ONLY DATABASE QUERIES USING MASTER AND SLAVE CONTROL PROCESSOR COMPLEXES, discloses a parallel query processing system comprising a front end processor, a query processing complex attached to the front end processor, and a database on a data repository attached by a first path to the front end processor, and by one or more additional paths, to one or more slave processors within the query processing complex. An external operations command processor within the front end processor quiesces database managers in the slave processors to permit maintenance operations by the front end processor, and restarts the slave processors in read-only mode after maintenance operation completion.

U.S. Pat. No. 5,590,319 issued Dec. 31, 1996 to Cohen et al. for QUERY PROCESSOR FOR PARALLEL PROCESSING IN HOMOGENOUS AND HETEROGENEOUS DATABASES, discloses a query processor for parallel processing which translates an input query which references data stored in one or more homogenous or heterogeneous databases into a plurality of parallel output queries each of which is directed to a single one of the databases or a partition thereof.

U.S. Pat. No. 5,675,791 issued Oct. 7, 1997 to Bhide et al. for METHOD AND SYSTEM FOR DATABASE LOAD BALANCING, discloses a method and system for partitioning a database and for balancing the processing load among processing nodes in a data processing system.

U.S. Pat. No. 5,437,032 issued Jul. 25, 1995 to Wolf et al. for TASK SCHEDULER FOR A MULTIPROCESSOR SYSTEM, discloses a task scheduler for use in a multiprocessor, multitasking system in which a plurality of processor complexes, each containing one or more processors, concurrently execute tasks into which jobs such as database queries are divided.

U.S. Pat. No. 5,613,106 issued Mar. 18, 1997 to Thurman et al. for METHOD FOR PROCESSING AND STORING A TRANSACTION IN A DISTRIBUTED DATABASE SYSTEM, discloses a transaction, consisting of a compilation of changes made to one or more data objects of a database, being transferred to a primary transaction engine of a primary database of processing. If one of the transactions is not successfully processed, the system takes corrective action and optionally notifies the user.

U.S. Pat. No. 5,742,806 issued Apr. 21, 1998 to Reiner et al. for APPARATUS AND METHOD FOR DECOMPOSING DATABASE QUERIES FOR DATABASE MANAGEMENT SYSTEM INCLUDING MULTIPROCESSOR DIGITAL DATA PROCESSING SYSTEM, discloses a system for database query processing by means of "query decomposition" which intercepts database queries prior processing a database management system. The system decomposes at least selected queries to generate multiple subqueries for application, in parallel to the database management system, in lieu of the intercepted query. Responses by the database management system to the subqueries are assembled by the system to generate a final response.

U.S. Pat. No. 5,692,174 issued Nov. 25, 1997 to Bireley et al. for QUERY PARALLELISM IN A SHARED DATA DBMS SYSTEM, discloses a system and method for a computer system having a plurality of database management systems providing a coordinating and assisting function. Each coordinating database management system receives a query from a user application, decomposes the query into multiple parallel tasks, and allocates the parallel tasks to all of the database management systems in the system. Each assisting database management system receives one or more parallel tasks from a coordinating database management system, executes the parallel task and returns the results to the coordinating database management system. The disclosed system dynamically disables a parallel mode on the coordinating database management systems and the assisting database management systems.

U.S. Pat. No. 5,857,180 issued Jan. 5, 1999 to Hallmark et al. for METHOD AND APPARATUS FOR IMPLEMENTING PARALLEL OPERATIONS IN A DATABASE MANAGEMENT SYSTEM, discloses a system and method for locating transaction and recovery information at one location and eliminates the need for read-locks and two-phase commits in a parallel processing database management system.

SUMMARY OF THE INVENTION

The present invention is an enhancement for the management and recovery of transactional workloads (herein referred to as queries) in a data warehousing environment that is implemented on a parallel cluster of computers. These large parallel systems are comprised of hundreds of computers that execute complex queries which potentially take hours to complete. It is imperative to manage and schedule the workload effectively, as well as guarantee its completion, even in the event of a brief system outage or recovery action, which tends to occur more frequently in a large parallel cluster. It is also important to allow dynamic changes of policies to be enforced on queries, or to prioritize certain types of queries, if the parallel system is functioning in a degraded state.

The preferred data warehouse implementation is one that views the long-running queries as batch jobs with a Query Management Subsystem (QMS) that can accommodate and manage all incoming query workloads. In the present invention, a Query Resubmittal Mechanism (QRM) is part of the QMS and guarantees the completion of all submitted queries. QRM of the present invention gives the applications and users the perception that the parallel data warehouse database system is never unavailable.

It is a primary object of the present invention to provide a QMS that includes a QRM which will provide the ability to manage a durable work queue of queries running on the system.

It is another object to provide a QRM with the ability to manage a dynamic limit of concurrent queries allowed on the system, beyond which subsequent queries submitted will be queued.

It is another object to provide a QRM with the ability to detect a system outage and/or reconfiguration.

It is another object to provide a QRM with the ability to retain queries aborted as a result of a system outage and/or reconfiguration.

It is another object to provide a QRM with the ability to submit and resubmit queries after the system is detected to be online.

It is another object to provide a QRM with the ability to readjust the limit of active queries when the system is operating in a degraded state.

It is another object to provide a QRM which itself is not a single point of failure.

These and other objects will be apparent to one skilled in the art from the following drawings and detailed description of the invention.

DESCRIPTION OF THE PREFERRED EMBODIMENT

Figure 1:
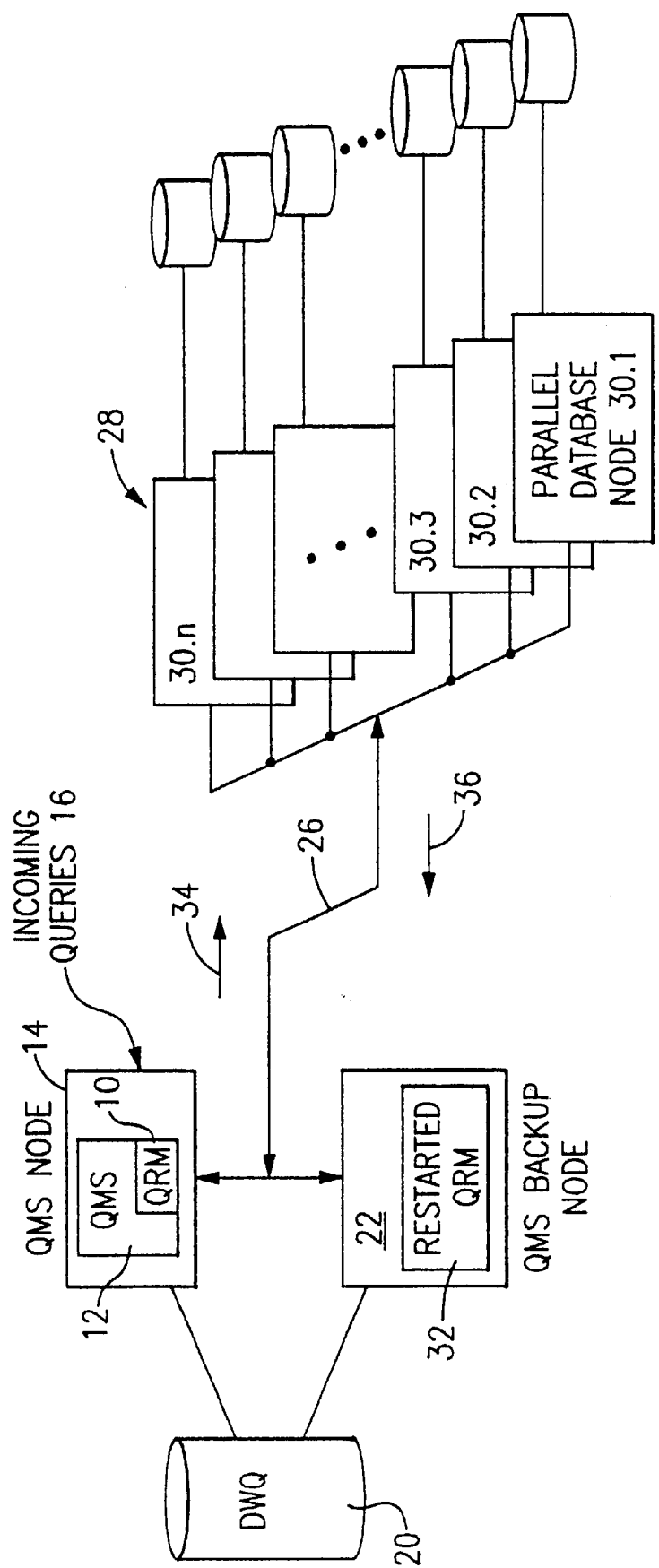
FIG. 1 is a schematic diagram showing a hardware configuration of an implementation of the Query Resubmittal Mechanism of the present invention as a part of a Query Management Subsystem.

FIG. 1 illustrates the Query Resubmittal Mechanism (QRM) 10 of the present invention is a part of a Query Management Subsystem (QMS) 12 that runs on a dedicated server QMS server 14. The QMS may be driven by any of known query management packages in which a query is submitted to a server for searching a database to find the record or records which satisfy the conditions of the query. Such a query management package is the PowerBuilder package available from Sybase, Inc. of Emeryville, Calif.

Incoming queries 16 come into the QMS 10, in a manner well known by those skilled in the art, and are placed into a work queue 20, as is known. To ensure that the QMS 10 is not itself a single point of failure, the work queue 20 (labeled in FIG. 1 as DWQ) is made durable by making it accessible to a QMS backup server 22 in a highly available configuration. The DWQ 20 may be made available to both the QMS node 14 and the QMS backup node 22 by a feature such as, for instance, the IBM HACMP product available from International Business Machines Corporation (IBM) of Armonk, N.Y. The system of FIG. 1 may be, for instance, an RS/6000 Scalable POWERparallel SP system, also available from IBM running a recovery code such as the HACMP-ES code, also available from IBM. The QMS servers 14 and 22 are connected by a network or networks 26 to a plurality of parallel database subsystem 28 having parallel database nodes 30.1 to 30.N. The QMS 12 is a centralized query submission and management point where the QRM 10 is implemented. The QMS intercepts incoming queries 16 and manages concurrent work on the parallel database subsystem 28, as well as the QRM functionality, returning work to the initiator of the queries 16 when completed. The QMS 12 is shown on an availability cluster where the DWQ 20 is on a shared disk that is acquired and used by a restarted QRM 32 on the backup QMS node 22, if the primary QMS node 12 should fail.

The parallel database subsystem 28 comprises the server 30.1–30.n collective where the QMS-dispatched queries are executed. The parallel database may be a cluster or grouping of availability clusters, or neither. If a cluster is implemented, changes of status are passed reliably to the QRM in a known manner. Query results also indicate the system reconfiguration information to the QRM 10 in the QMS 12. Manual feedback of status to the QMS 12, in a known manner, is possible. As shown by arrow 34, database client connections, queries to the database and database control signals are sent from the QMS server 14 to the parallel database subsystem 28. As shown by arrow 36, query results and database cluster status is returned from the parallel database subsystem 28. Queries in the DWQ 20 may have a status "A" or active status, or may have a status "Q" or queued status, to be discussed.

It will be understood that a high availability program is present to recover failures of the QMS node 14 or the QMS backup node 22, and that another high availability program is present to detect and recover a failure of one for more of the nodes 30.1–30.n of the parallel database subsystem 28.

Figure 2:
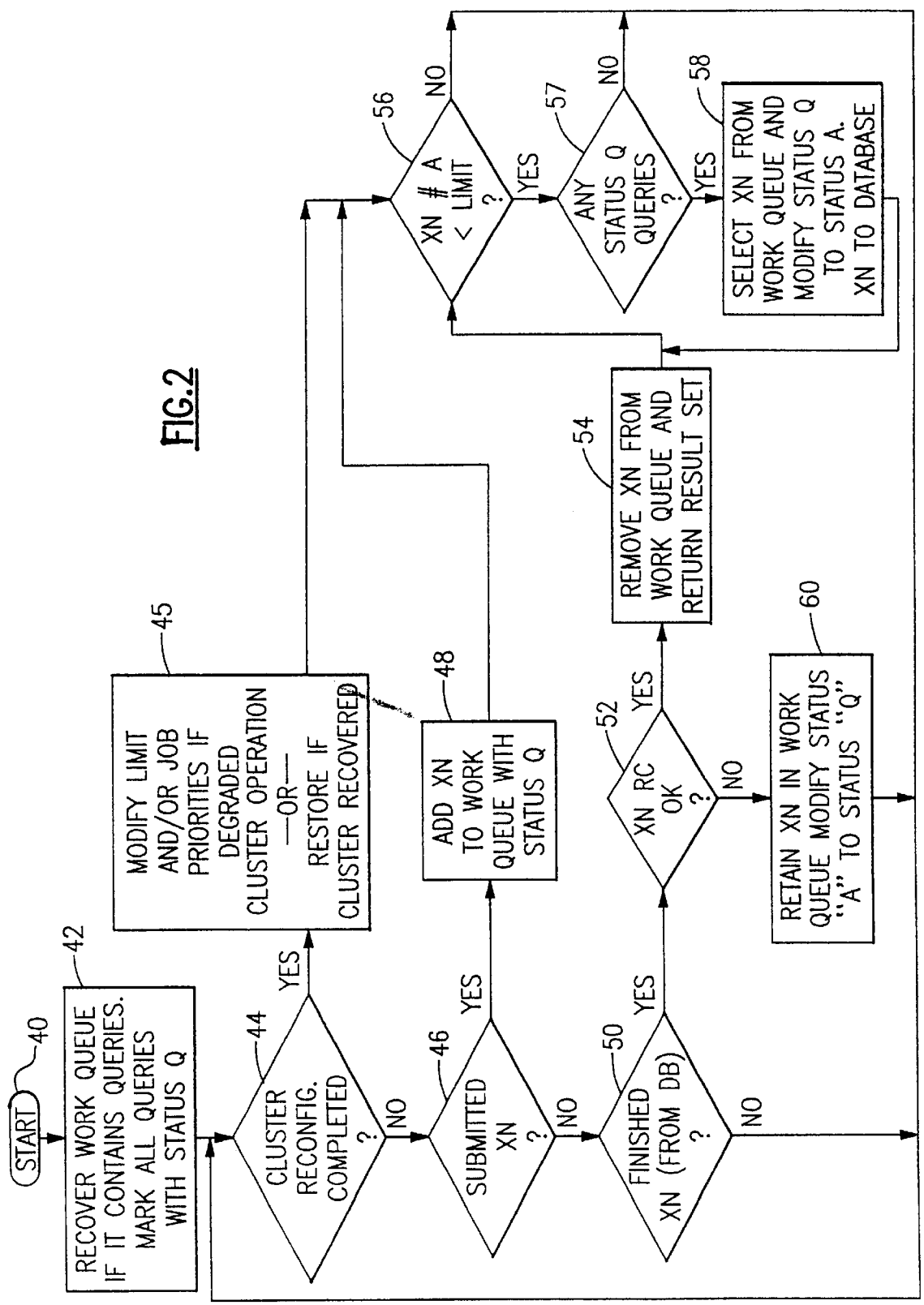
FIG. 2 is a flow diagram of the Query Resubmittal Mechanism of FIG. 1.

FIG. 2 is a flowchart of the QRM 10, and starts at 40, such as at initial startup or a recovery action has been started by a high availability program for the QMS node 14 or the backup node 22. At 42, the work queue in the DWQ 20 is recovered and if it contains any queries from a previous run, they are all marked with status "Q". This allows recovery and retention/resubmission of queries should the QMS/QRM server 14 fail and be restarted by the high availability mechanism on the backup server 22, or if the server 14 is otherwise stopped and restarted. The start process of 42 will appear as a cluster reconfiguration (44 below) when a connection to the high availability program for the parallel database subsystem 28 is established, ensuring resubmission of recovered queries in the work queue.

At 44, QRM 10 checks to see if any cluster reconfiguration of a high availability program from within the parallel database subsystem 28 is completed. If yes, at 45 QRM 10 modifies the limit and/or job priorities of QMS 12 if the cluster is operating in a degraded mode, or restores the limits and job priorities if the cluster has been restored.

At 46, QRM 10 checks to see if a transaction or query (shown in FIG. 2 as "XN") has been submitted. If yes, at 48 QRM 10 adds the query to the DWQ work queue 20 with the status "Q". If a query has not been completed at 46, QRM 10 checks at 50 to see if the previous query from the parallel database subsystem 28 is finished. If yes, a check is made at 52 to see if the transaction return code (RC) is OK. This is the return code from the parallel database subsystem 28 shown at 36, and indicates that the last query was successful. If there is yes at 52, the query is removed from the work queue 20, and the return result is set at 54. This will indicate to QMS 12 when the recovery is complete that the query was successful. After each of the actions at 45, 48 and 54, QRM 10 checks at 56 to see if the number of queries in the work queue with the status "A" (active) is less than a user-defined limit for concurrent queries. If yes, QRM 10 checks at 57 to see if there are any queries with status "Q". If yes, at 58 the oldest query having status "Q" is changed to status "A", and the query is invoked on the parallel database subsystem 28. A process is spawned from the QRM 10 which admits the query through the database interface 16, and also emulates the database connectivity back to the end user or application. The process is supervised and controlled by the QRM 10, and the process notifies the QRM 10 when the query is completed. Return is made to the check at 56, and the program loops until the active queries in the work queue 20 equals the user set limit of active queries, or until all queries are active and their total number is less than the user set limit.

If the return code RC at 52 is not OK, such as, for example RC indicates a parallel database subsystem 28 failure, at 60 the transaction or query is retained in the work queue 20, and its status is modified from status "A" to status "Q". The no output of the check 56, the no output of check 57, the output of the actions at 60, and the no output of the check at 50 all return to the check at 44 to see if the cluster reconfiguration is completed.

It can thus be seen that the QRM activity is comprised of three checks 44, 46 and 50 which spawn QRM activity:

1) at 44, a cluster reconfiguration. If the parallel database subsystem 28 reconfigures for any reason, the QRM 10 is notified and the parameters pertinent to this reconfiguration is modified. The modification includes adjusting the type or amount of workload (concurrent queries) that can now run on the parallel database subsystem 28. The state of the parallel database subsystem 28 is determined by one to the following methods: (a) availability of cluster status from the application program interface (API) of the parallel database 28; (b) database cluster status; (c) (a) and (b); or (d) a manual process. This modification might be for a reconfiguration due to a failure, or might be to restore limits and/or priorities because of an initial startup or because a failure has been recovered.

2) at 46, a query is submitted through the QRM 10 at interface 16. The QMS 12 appears to end user and applications as a database server. If so, it is added to the work queue as a queued or status "Q" query.

3) at 50, a query result 36 is received from the parallel database subsystem 28. If the return code RC from the query is one not indicating a system failure, the query is removed form the work queue 20. Otherwise the query will be retained in the work queue 20 by changing its status in the queue 20 from active "A" to queued "Q".

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. An apparatus for resubmitting queries responsive to recovery actions of a high availability function, said apparatus comprising:
   a work queue;
   a database subsystem;
   a first server submitting queries from said work queue to said database subsystem;
   a module responsive to the high availability function, said module including a first function interrogating said work queue to determine if the work queue contains uncompleted queries at the start of said recovery actions;
   a first check in said module determining if reconfiguration of the database subsystem has been completed responsive to said recovery actions; and
   a second function in said module which, responsive to the completion of said reconfiguration as determined by said first check, modifies the number of job priorities of the uncompleted queries if the database subsystem is operating in a degraded state due to said reconfiguration.

2. The apparatus of claim 1 further comprising:
   a second check in said module determining if an uncompleted query had been submitted to said database subsystem at the start of the recovery actions; and
   a third function adding said uncompleted query determined by said second check to said work queue with a queued (Q) status.

3. The apparatus of claim 2 further comprising:
   a third check in said module determining when any query submitted from said server to said database has been finished by said database;
   a fourth check in said module determining whether the query determined by said third check to have been finished by said database contains Return Codes (RC) which are OK or not OK.

4. The apparatus of claim 3 further comprising:
   a fourth function in said module which, when said fourth check determines that the RC is not OK, retains the query determined by said third check in said work queue, and modifies the status of that retained query from an Active (A) status to the Q status.

5. The apparatus of claim 3 further comprising:
   a fifth function in said module which, when said fourth check determines that the RC is OK, removes the query determined by said third check from said work queue.

6. The apparatus of claim 5 further comprising:
   a fifth check in said module determining when the query of each of said second, third, and fifth functions exceed a predetermined limit of active queries allowed in said work queue; and
   a sixth function in said module which, when said predetermined limit of said fifth check is not exceeded, selects from the work queue, the oldest query in said work queue having a Q status, and modifying its status to A.

7. The apparatus of claim 1 further comprising:
   a second server for being used by the high availability function in the recovery actions to replace said first server if said first server fails, said work queue being accessible by both of said first server and said second server, thereby making said work queue durable in the event said first server is replaced by said second server.

8. A method for resubmitting queries to recovery actions of a high availability function, said method comprising the steps of:

a) providing a work queue;

b) providing a database subsystem;

c) submitting from a first server, queries from said work queue to said database subsystem;

d) responsive to said recovery actions, interrogating said work queue to determine if the work queue contains uncompleted queries at the start of said recovery actions;

e) determining if reconfiguration of the database subsystem has been completed responsive to said recovery actions; and f) responsive to the completion of said reconfiguration as determined by step e), modifying the number and/or job priorities of the uncompleted queries if the database subsystem is operating in a degraded state due to said reconfiguration.

9. The method of claim 8 further comprising:

g) determining if an uncompleted query had been submitted to said database subsystem at the start of the recovery actions; and h) adding said uncompleted query determined by step g) to said work queue with a queued (Q) status.

10. The method of claim 9 further comprising:

i) determining when any query submitted from said server to said database has been finished by said database;

j) determining whether the query determined by step i) to have been finished by said database contains Return Codes (RC) which are OK or not OK.

11. The method of claim 10 further comprising:

k) when step j) determines that the RC is not OK, retaining the query determined by step i) in said work queue, and modifying the status of that retained query from an Active (A) status to the Q status.

12. The method of claim 11 further comprising:

l) when step k) determines that the RC is OK, remove the query determined by i) from said work queue.

13. The method of claim 12 further comprising:

m) determining if the query of each of steps f), h), and l) exceed a predetermined limit of active queries allowed in said work queue:

n) when said predetermined limit of step m) is not exceeded, select from the work queue the oldest query in said work queue having a Q status, and modifying its status to A.

14. The method of claim 8 further comprising:

providing a second server for being used by the high availability function in the recovery actions to replace said first server if said first server fails; and making said work queue being inaccessible by both of said first server and said second server, thereby making said work queue durable in the event said first server is replaced by said second server.

15. A computer program product comprising a computer useable medium having computer readable program code means therein for use in resubmitting queries in a work queue from a query management subsystem residing on a first server to a database responsive to recovery actions of a high availability function, said computer readable program code means in said computer program product comprising:

computer readable program code means for submitting queries by said first server from said work queue to said database subsystem;

computer readable program code means for interrogating said work queue to determine when the work queue contains uncompleted queries at the start of said recovery actions;

computer readable program code means for determining from a first check when reconfiguration of the database subsystem has been completed responsive to said recovery actions; and computer readable program code means in a first function for, responsive to the completion of said reconfiguration as determined said first check, modifying the number or job priorities of the uncompleted queries if the database subsystem is operating in a degraded state due to said reconfiguration.

16. The computer readable program code means in said computer program product of claim 15 further comprising:

computer readable program code means for determining in a second check if an uncompleted query had been submitted to said database subsystem at the start of the recovery actions; and computer readable program code means in a second function for adding said uncompleted query determined by said second check to said work queue with a queued (Q) status.

17. The computer readable program code means in said computer program product of claim 16 further comprising:

computer readable program code means for determining in a third check when any query submitted from said server to said database has been finished by said database;

computer readable program code means for determining in a fourth check whether the query determined by said third check to have been finished by said database contains Return codes (RC) which are OK or not OK.

18. The computer readable program code means in said computer program product of claim 17 further comprising:

computer readable program code means for, when said fourth check determines that the RC is not OK, retaining the query determined by said third check in said work queue, and modifying that retained query status from an Active (A) status to the Q status.

19. The computer readable program code means is said computer program product of claim 18 further comprising:

computer readable program code means in a third function for, when said fourth check determines that the RC is OK, removing the query determined by said third check from said work queue.

20. The computer readable program code means in said program product of claim 19 further comprising:

computer readable program code means for determining in a fourth check, if the query of each of said first, second and third functions exceed a predetermined limit of active queries allowed in said work queue; and computer readable program code means for when said predetermined limit of said fourth check is not exceeded, selecting from the work queue, the oldest query in said work queue having a Q status, and modifying its status to A.

* * * * *